J. B. O'DONNELL.
FARM TRACTOR.
APPLICATION FILED JULY 14, 1915.
1,191,817.
Patented July 18, 1916.
3 SHEETS—SHEET 2.
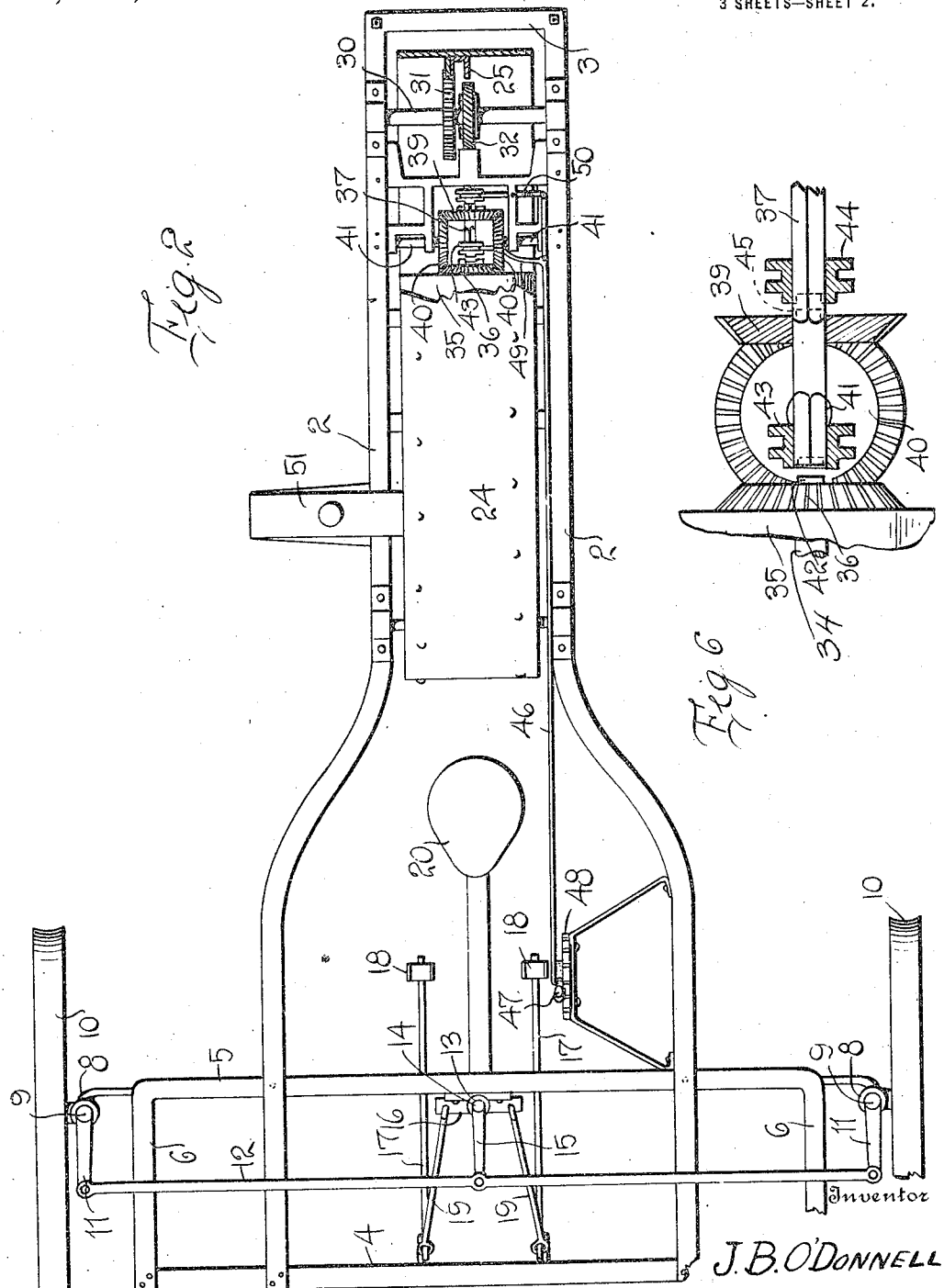
Inventor
J. B. O'Donnell
By Watson E. Coleman
Attorney J. B. O'DONNELL.
FARM TRACTOR.
APPLICATION FILED JULY 14, 1915.
1,191,817.
Patented July 18, 1916.
3 SHEETS—SHEET 3.
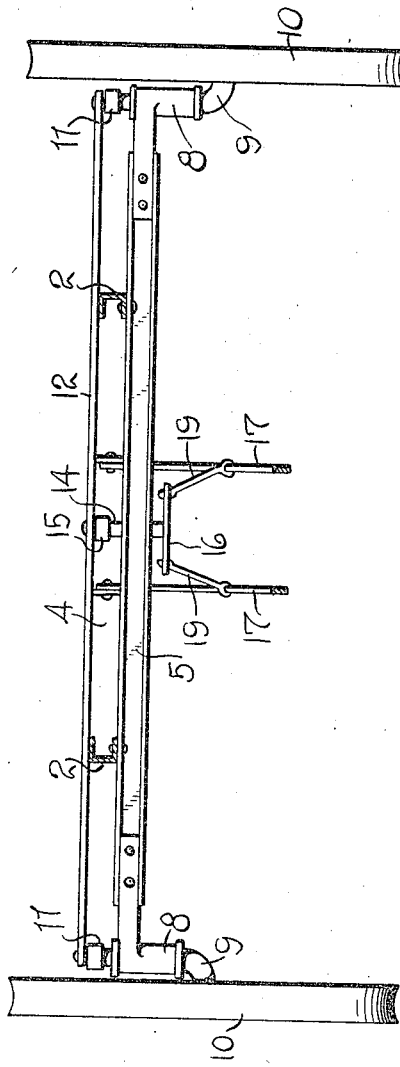
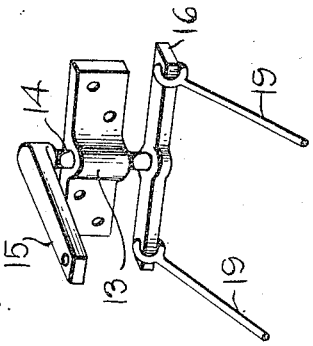
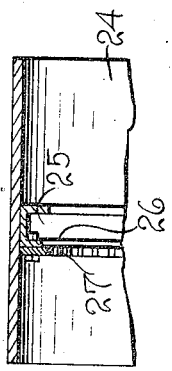
Inventor
J. B. O'Donnell
By Watson E. Coleman
Attorney

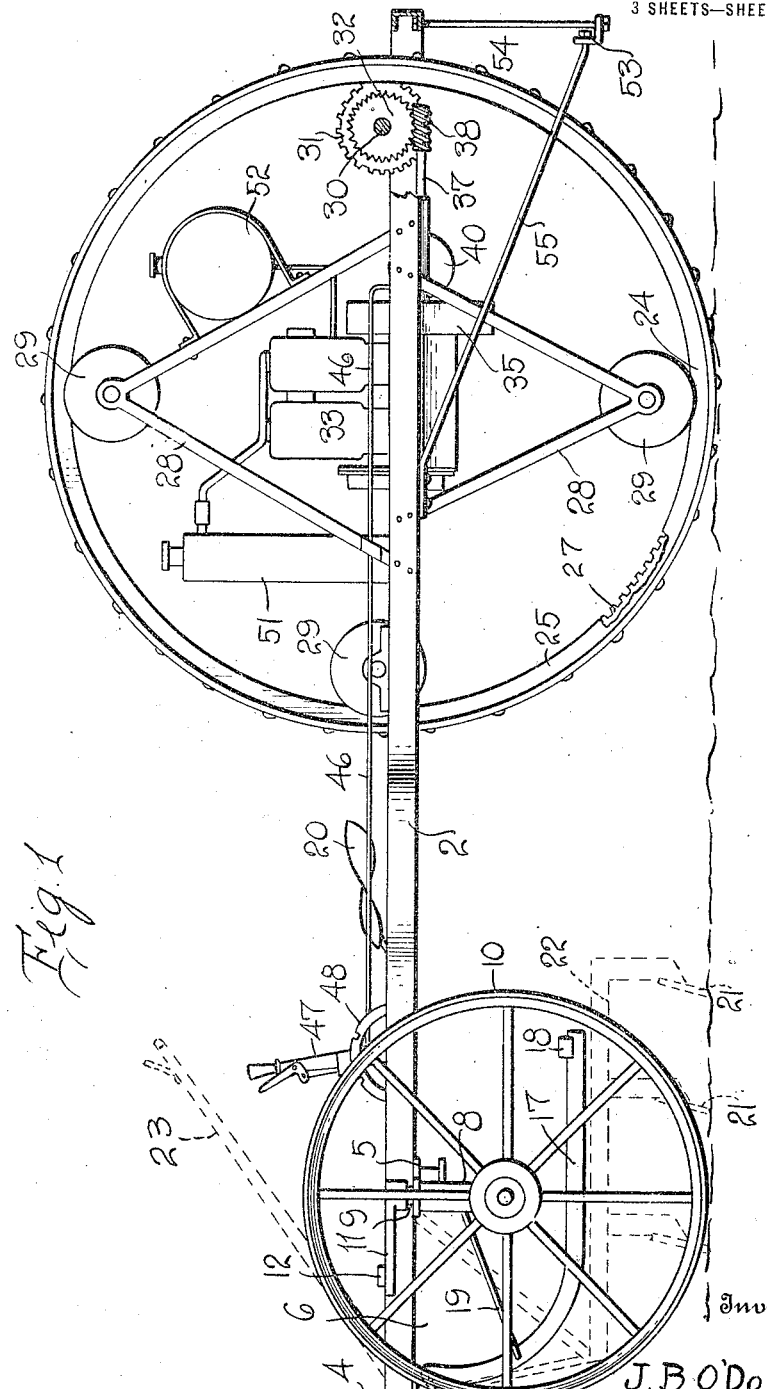

UNITED STATES PATENT OFFICE.

JOHN B. O'DONNELL, OF SHELDON, IOWA.

FARM-TRACTOR.

1,191,817.　　　　　Specification of Letters Patent.　　Patented July 18, 1916.

Application filed July 14, 1915. Serial No. 39,874.

*To all whom it may concern:*

Be it known that I, JOHN B. O'DONNELL, a citizen of the United States, residing at Sheldon, in the county of O'Brien and State of Iowa, have invented certain new and useful Improvements in Farm-Tractors, of which the following is a specification, reference being had to the accompanying drawings.

This invention relates to tractors, and particularly tractors designed for farm work.

The primary object of my invention is the provision of a tractor which may be either used as a draft tractor or as a tractor for plowing, in which case the plows are mounted at the forward end of the tractor and thus pushed in advance thereof.

Still another object of the invention is to provide an improved means for actuating the driving wheel of the tractor which includes a motor disposed within the driving wheel, thus economizing space and reducing the width of the driving wheel.

Still another object of my invention is the provision of a tractor driven cultivator wherein almost all of the entire weight is disposed at the rear of the machine and bears upon the drive wheel, the front end of the cultivator thus being relieved of a large portion of its weight so that the steering mechanism may be more easily operated.

Other objects will appear in the course of the following description.

My invention is illustrated in the accompanying drawings, wherein:

Figure 1 is a side elevation of my improved tractor; Fig. 2 is a top plan view thereof; Fig. 3 is a transverse section just rearward of the forward wheels to show the steering mechanism; Fig. 4 is a transverse section of the drive wheel and of the flanges and ribs mounted thereon; Fig. 5 is a perspective detail view of a portion of the steering mechanism; and Fig. 6 is a detail view, partly in section, of the transmission gearing.

The frame of the tractor consists of the oppositely disposed parallel longitudinally extending beams 2 connected at their rear ends, as at 3, and carrying at their forward ends the transversely extending beam 4 and the parallel transversely extending beam 5, which, inasmuch as it supports the forward wheels, constitutes a forward axle. As illustrated, the beam 5 is bent, as at 6, to connect with the beam 4, but it will be understood that any desirable construction may be used in place of the specific construction illustrated. The beams are preferably made of channel or angle iron.

As illustrated in Fig. 3 the axle 5 at its ends is formed with vertically disposed sleeves 8 in which are mounted the knuckles 9 whose angular lower ends support the wheels 10. Each knuckle 9 is provided with a radially projecting arm 11, these arms being connected by means of a transverse steering rod 12 so that the knuckles will have unitary movement. Mounted upon the beam 5 is a sleeve 13, and disposed within this sleeve is a rotatable vertical shaft 14 carrying upon its upper end the outwardly projecting arm 15 having the same radius as the arms 11. This arm 15 is pivotally connected in any suitable manner to the steering rod 12 and carries upon its lower end the cross bar 16. Pivotally mounted upon the beam 4 in any suitable manner are the angular levers 17 each of which extends downward and then rearward from the pivotal axis of the lever and carries at its rear end the pedal plate 18. The downwardly extending portion of each arm is operatively connected to the corresponding end of the cross bar 16 by means of a link 19 as illustrated clearly in Fig. 5. It will be obvious now that when the operator is seated on the seat 20 his feet will engage in the treadle 18 and be in position to operate the levers 17. It will be obvious that upon a depression of one of the levers 17 the connecting rod 12 will be shifted in a direction to steer the machine to the left, while upon a depression of the other lever the rod will be shifted to steer the machine to the right. Thus the steering of the machine is entirely accomplished by the operator's feet, leaving his hands free to manipulate the controlling levers of the plows or cultivators. It will also be apparent that the operator is seated at the front of the machine and that there is nothing in front of him that will impede his view so that he can without trouble control the cultivator mechanism and without trouble control the steering of the machine.

The steering mechanism above described forms the subject of a separate application for patent Serial No. 77,956, filed on the 12th day of February, 1916.

I do not wish to be limited to any particular type of cultivators or other ground engaging devices mounted upon the frame, or to any particular means for connecting the cultivator beams or plows to the frame. I have, therefore, merely indicated the plows or cultivators in dotted lines. The cultivator shovels are designated 21 and the beams carrying the shovels 22, while one of the levers for controlling the position of the cultivator shovels is designated 23, as shown in dotted lines. All of these parts may be of any suitable or ordinary construction.

The rear end of the machine is supported by means of a bull wheel or driving wheel designated 24. As illustrated in Figs. 1 and 4 this driving wheel 24 is formed at its middle with an annular rib 25 and to one side of its middle with an annular flange 26 to which is attached a toothed annulus 27. Mounted upon the frame of the machine in any suitable manner, as upon the V-shaped brackets 28, are a plurality of grooved guide wheels 29 which engage the rib 25 and hold the bull wheel from lateral movement, and mounted upon the bars 2 of the machine is a transversely extending shaft 30 and mounted upon this shaft 30 is a toothed pinion 31. This is grooved to embrace the annulus 27 and the bottom of the groove is toothed to engage the teeth of the annulus. Also mounted upon this shaft 30 is a worm wheel 32 which is driven by mechanism now to be described.

Mounted upon the frame of the machine in any suitable manner and disposed entirely within and centrally of the drive wheel 24 is an engine 33 which is illustrated as of the internal combustion variety. The driving shaft of this engine, designated 34, carries upon it the fly wheel 35. Mounted upon this shaft 34 and illustrated as forming part of the fly wheel 35 is a miter gear wheel 36. Disposed in alinement with the shaft 34 and extending rearward therefrom is a shaft 37 which is supported in suitable bearings formed upon the frame of the machine and carries upon it the worm 38 which meshes with the worm wheel 32. Loosely mounted upon the shaft 37 is a miter gear wheel 39 and engaging the gear 36 with the gear 39 are the oppositely disposed miter gear wheels 40 each mounted upon a shaft 41 supported in suitable brackets in bearings on the frame of the machine. Coacting with the clutch member 42 fixed upon the gear wheel 36 is a shiftable clutch member 43, and shiftably mounted upon the shaft 37 rearward of the gear wheel 39 is a shiftable clutch member 44 which coacts with the clutch member 45 mounted upon the gear wheel 39.

Extending rearward from a point one side of and slightly forward of the driver's seat is a controlling rod 46 whose forward end is operatively connected in any suitable manner to a controlling lever 47 operating over an arcuate sector 48 and held in adjusted position by any suitable locking means. This rod 46 adjacent its rear end has a laterally projecting arm 49 which engages the clutch 43, and the rearward extension of the rod 46 rearward of the arm 49 is pivotally connected to a shipper lever 50 in turn operatively connected to the clutch 44 in the usual manner. Upon a forward movement of the lever 47 the rod 46 will move forward, which will carry the clutch 43 into its engagement with the clutch member 42 and will carry the clutch 44 out of operative engagement with the clutch member 45. Under these circumstances a direct drive will be communicated to the bull wheel 44 and the machine will proceed in the forward direction. When, however, the lever 47 is shifted rearward the clutch member 43 will be thrown out of its engagement with the clutch member 42 and the clutch member 44 will be thrown into engagement with the clutch member 45, and as a consequence the machine will move rearward through the intermediate gearing illustrated. It will thus be seen that by a very simple mechanism I secure either a forward or rearward drive of the machine, and while I have illustrated what I believe to be the most effective and the simplest form of transmission gearing for securing this forward and rearward drive, I do not wish to be limited thereto as it is obvious that other mechanism might be used for this purpose, though I believe this is the most effective form.

As before stated, the engine is disposed at the center of the bull wheel, and all of the heaviest machinery is thus disposed at the rear end of the machine and not at the forward end thereof. This makes the tractor easy to steer and easy to handle, and does not force the forward end of the tractor too deeply into the ground. The rear end of the tractor being supported by the relatively wide bull wheel, acts to support the weight in a much better fashion than would the relatively narrow forward steering wheels. The radiator 51 of the engine 33 is shown as disposed so as to project laterally beyond the frame of the machine so as to receive the air and secure a proper cooling action upon the cooling system. I do not wish to be limited, however, to this exact arrangement for the radiator. I have also illustrated the gasolene tank 52 as being disposed upon the upwardly extending braces 28, but here again it is obvious that modifications may be made. The whole object, however, is to dispose the engine and its allied parts in a compact form and within the wheel 24 and as near as possible at the center thereof.

In order to provide for the tractor being used for hauling purposes, I mount upon the frame of the tractor at the rear end thereof the transverse angle iron draw bar 53, which, as illustrated, is supported by the vertical braces 54 from the rear cross bar 3 and which is also supported by longitudinally extending upwardly inclined braces 55 which are attached to the bars 2.

While I have illustrated an ordinary type of clutch 42, 43, 44 and 45, I wish it understood that I may use any form of clutch which I shall find most desirable, as for instance, the ordinary expansion clutch, and that the showing of the clutch is purely illustrative. It will be noted that in my machine the pinions or gear wheels of the transmission mechanism are always held in mesh and that thus there are no gears to shift in order to secure forward and reverse movement. Furthermore, it will be seen that the rear end of the machine may be made very narrow so as to readily pass between the rows of plants being cultivated and yet at the same time the machine may be relatively light. My whole design is to provide a light farm tractor. Farm tractors of a relatively heavy character have been provided for use in plowing, but these tractors are entirely too heavy for use in cultivating corn and other plants, and being heavy the steering is relatively difficult. By shifting the greater portion of the weight of the machine rearward so that it is supported by the driving wheel, I am enabled to use relatively light steering wheels and secure that delicacy of action which is particularly necessary where a tractor is used for cultivating. Furthermore, by placing the engine and other allied parts at the rear of the machine I leave the front of the machine entirely unobstructed so that the driver may readily see what he is about, and may readily control not only the movement of the machine but the operation of the cultivators.

Having thus described my invention, what I claim is:

1. In a tractor of the character described, a supporting frame, a single annular spokeless drive wheel disposed with its middle plane in the median plane of the frame, a plurality of bearing wheels mounted upon the frame and engaging the inner face of the drive wheel to thereby support the frame upon the drive wheel, the several bearing wheels rotating in the same plane as the plane of the drive wheel and having their peripheries engaging with and bearing against the inner face of the drive wheel, a motor mounted upon the supporting frame within the drive wheel, and mechanism for transmitting the power of the motor to the drive wheel.

2. In a tractor of the character described, a supporting frame, steering wheels mounted at the forward end of the frame, upwardly and downwardly extending triangular braces mounted upon the rear end of the frame, grooved bearing wheels supported upon said braces, a grooved bearing wheel supported upon the frame forward of the braces, an annular spokeless drive wheel having an internal rib with which said grooved wheels engage and by which the frame is supported in proper relation to the drive wheel, a rack on the interior of the drive wheel, a gear wheel engaging said rack, and a motor mounted within the drive wheel and operatively engaged with said gear wheel.

3. In a tractor of the character described, a supporting frame, an annular spokeless drive wheel having an internal annular rib, a plurality of grooved bearing wheels operatively supported upon the frame and engaging said rib, said bearing wheels forming the sole means for supporting the spokeless drive wheel and holding the drive wheel in proper relation to the frame and from lateral movement but permitting the rotation of the drive wheel, a motor disposed within the drive wheel, and gearing operatively connecting the motor with said drive wheel.

4. In a tractor of the character described, a supporting frame, steering wheels mounted at the forward end of the frame, means disposed at the forward end of the frame for directing said steering wheels, an annular spokeless drive wheel disposed at the rear end of the frame and having internal gear teeth, supporting wheels upon which the drive wheel rotates and by which it is held in position from transverse movement, an engine supported upon the frame and disposed within the drive wheel, a driving shaft operatively connected to the engine, a miter gear wheel mounted upon the shaft, a second shaft in alinement with the first named shaft and forming an extension thereof, an oppositely disposed miter gear wheel mounted thereon, idle miter gear wheels engaged by both of said first named gear wheels, a clutch for connecting or disconnecting the first and second named shafts, a clutch for connecting the second named shaft with the second named gear wheel, means for operating said clutches, a worm mounted upon the second named shaft, a worm wheel with which said worm engages, and a driving pinion engaging the teeth of the drive wheel and driven by said worm wheel.

In testimony whereof I hereunto affix my signature in the presence of two witnesses.

JOHN B. O'DONNELL.

Witnesses:
  FREDERIC B. WRIGHT,
  FREDERICK S. STITT.